United States Patent Office 2,750,421
Patented June 12, 1956

2,750,421

PROCESS FOR THE PRODUCTION OF CRYSTALLINE CYCLOHEXYL PEROXIDES

Paul Halbig, Fribourg, Switzerland, assignor to Lonza Electric and Chemical Works Ltd., Gampel, Wallis, Switzerland, a Swiss company No Drawing. Application November 30, 1953, Serial No. 395,251

Claims priority, application Switzerland February 6, 1953

4 Claims. (Cl. 260—610)

It is known to prepare different peroxides of cyclohexanone by the action of hydrogen peroxide on cyclohexanone. For example, 1-hydroxy-cyclohexyl-hydroperoxide-1 was described by Stoll and Scherrer in "Helvetica Chimica Acta" XIII A, 141 (1930). The same substance is described by Milas in United States patent specification No. 2,298,405. In the same specification, Milas indicates the method of preparing 1,1'-dihydroxy-dicyclohexyl peroxide-1-1'. The former in the pure state contains 12.13% of active oxygen and melts at 76–78° C., while the second in the pure state contains only 6.89% active oxygen and melts at 68–70° C. The preparation is comparatively difficult, particularly on a relatively large scale, because first of all viscous resinous masses are formed, so that it is necessary to use organic solvents in order to remove the reaction mass from the apparatus and to initiate the crystallisation. Moreover, according to Milas, anhydrous hydrogen peroxide is necessary, which involves considerable expense and dangers. The yields scarcely reach 60% of the theoretical. These peroxides are of considerable technical interest, for example, as bleaching agents, germicides, as accelerators for polymerisation, combustion and explosion processes.

The subject of this application is a process which renders it possible for peroxides of cyclohexanone with 12–18% active oxygen content to be produced rapidly and with a good yield in the presence of water and without using organic solvents, the peroxides being obtained in crystalline form with a good yield on a technical scale.

The process consists in that cyclohexanone is stirred into an aqueous solution of mineral acid and hydrogen peroxide, a large excess of hydrogen peroxide (for example, 1/20–1/5 of the total quantity of cyclohexanone to the total quantity of hydrogen peroxide) being maintained until the crystallisation has started. Additional cyclohexanone is then added until at least a molar ratio of hydrogen peroxide to cyclohexanone, such as 1.0:1.0 to 2.0:1.0, is reached. In this manner, the formation of resinous viscous masses is avoided. A fine-grain crystalline product is formed which is capable of being easily isolated, washed and dried.

Hydrochloric acid, sulphuric acid or nitric acid may, for example be used as mineral acid. Nitric acid is particularly suitable.

The content of active oxygen in the reaction product depends both on the quantity of hydrogen peroxide which is used and on the concentration of the mineral acid, as shown by the following table, in which the columns designated I to V represent:

I. Mol ratio of hydrogen peroxide to cyclohexanone.
II. Percentage by weight of nitric acid (100%) in the water of the reaction liquid before the addition of cyclohexanone.
III. Content of active oxygen in the isolated peroxide.
IV. Melting point (M. P.) of the peroxide expressed in degrees centigrade.
V. Yield of peroxide, calculated from the quantities of active oxygen introduced and recovered respectively.

| I<br>mols $H_2O_2$: mols cyclohexanone | II<br>Wt. percent $HNO_3$ | III<br>percent active $O_2$ in isolated peroxide | IV<br>melting Point, °C. | V<br>yield, percent |
|---|---|---|---|---|
| 1.1:1.0 | 2 | 12.46 | 73–74 | 73 |
| 1.1:1.0 | 4 | 12.70 | 74–75 | 78 |
| 1.1:1.0 | 20 | 14.56 | 61–65 | 85 |
| 1.2:1.0 | 20 | 15.80 | 65–75 | 94 |
| 1.5:1.0 | 20 | 16.56 | 79–81 | 78 |
| 2.0:1.0 | 20 | 17.90 | 80–81 | 66 |
| 4.0:1.0 | 20 | 17.80 | 80–81 | 31 |

It is seen from the table that:

(1) The yield of active oxygen, calculated on the quantity of hydrogen peroxide which is used and the quantity of cyclohexanone peroxide which is obtained, is best when the ratio of hydrogen peroxide to cyclohexanone=1.2:1.0.

(2) As the ratio of hydrogen peroxide to cyclohexanone is raised, the active oxygen content in the peroxide increases to a maximum value of about 18%. Accordingly, it serves no purpose to go beyond the ratio of 2.0:1.0.

(3) In addition to the known 1-hydroxy-cyclohexyl-hydroperoxide-1 with 12.1% theoretical content of active oxygen, there also exists a further peroxide of cyclohexanone with an active oxygen content of approximately 18%; this compound is probably formed by condensation of 2 mol cyclohexanone with 3 mol hydrogen peroxide by cleavage of 2 mol water, corresponding to a compound of molecular weight 262 with 3 active oxygen atoms.

(4) The hydroperoxide formed from 1 mol hydrogen peroxide and 1 mol cyclohexanone and having the theoretical content of 12.1% active oxygen, is formed in a pure state only by using relatively small concentrations of mineral acid.

As regards their suitability for polymerisation catalysts, all products with an active oxygen content of 12.5 to 17.8% were found to be equivalent. From a technical point of view, the product with the highest yield of active oxygen is naturally the most interesting.

Examples (1) 50 gm. of 29.5% hydrogen peroxide are mixed in a stirring vessel at 10–20° C. with 80 gm. of aqueous nitric acid having a content of 2 gm. nitric acid (100%). 3 gm. of cyclohexanone are then added drop by drop. After approximately 5 minutes, fine crystals begin to precipitate. Additional cyclohexanone is then added drop by drop until altogether 39.2 gm. have been added in 30 minutes. The temperature is kept at 10–20° C. by cooling. When all has been run in, the mixture is stirred for a further hour and the temperature adjusted to about 10° C. The content of the stirring vessel consists of a suspension of uniform small crystals. They are filtered off by suction and washed once with water. There are obtained about 70 gm. of a wet product which, on drying in air or in vacuo at 30–35° C., gives 43.3 gm. of dry product with a M. P. of 73–74° C. and a content of active oxygen of 12.46%.

(2) If the same preparation is carried out in such manner that hydrogen peroxide and cyclohexanone are added simultaneously drop by drop in molar ratio to the nitric acid, there is obtained a resinous mass which settles on the stirrer and the wall of the reaction vessel and can only be removed from the latter with the aid of a suitable solvent, such as, for example, ether. This method of working is less satisfactory than that described in Example 1.

(3) The operation is carried out as in Example 1, but starting with 4 gm. nitric acid (100%). The course of the reaction and the yield are practically the same. The product melts at 74–75° C. and has an active oxygen content of 12.70%.

(4) The operation is carried out as in Example 1, but starting with 20 gm. nitric acid (100%). 41.1 gm. of crystals are obtained with a M. P. of 61–65° C. and 14.56% active oxygen content.

(5) The operation is carried out as in Example 4, but with 55.2 gm. of 29.5% hydrogen peroxide. 45.3 gm. of crystals are obtained with an active oxygen content of 15.80%.

(6) The operation is carried out as in Example 5, but with 69.0 gm. of 29.5% hydrogen peroxide. 45.6 gm. of cyclohexyl peroxide are obtained with a M. P. of 79–81° C. and an active oxygen content of 16.56%.

(7) The operation is carried out as in the preceding example, but with 92.0 gm. of 29.5% hydrogen peroxide. 45.6 gm. of dry product are obtained with a M. P. of 80–81° and an active oxygen content of 17.90%. The result remains the same if twice the quantity of hydrogen peroxide is used.

All the products, with the exception of that obtained according to Example 2, are formed in beautiful small crystals which are capable of being easily removed from the reaction vessel. After washing with water and drying, the products are pure, and recrystallisation is not necessary. When heated to above the melting point, all products disintegrate with explosion. In the wet state, the peroxides can be stored and handled without danger at normal temperature.

What I claim is:

1. A process for the production of crystalline cyclohexyl peroxides with a 12 to 18% active oxygen content and melting points of 60 to 83° C. from 1 mol of cyclohexanone and 1–2 mols hydrogen peroxide without the use of organic solvents which comprises adding the cyclohexanone to an aqueous solution of the hydrogen peroxide containing a catalytic amount of a mineral acid, the rate of addition of such cyclohexanone being such that a large excess of hydrogen peroxide is maintained until crystals are formed in the reaction solution, and after completion of the reaction, separating the resulting crystalline reaction product from the aqueous reaction solution.

2. The process according to claim 1, in which initially cyclohexanone in a quantity of from $\frac{1}{20}$–$\frac{1}{5}$ of the total quantity of cyclohexanone is caused to react with the total quantity of hydrogen peroxide until crystals begin to form and only after crystals begin to precipitate is further cyclohexanone added until the required ratio of hydrogen peroxide to cyclohexanone is obtained.

3. The process according to claim 2, in which nitric acid is present as the mineral acid.

4. A process for the production of crystalline cyclohexyl peroxides with a 12 to 18% active oxygen content and melting points of 60 to 83° C. from 1 mol of cyclohexanone and 1–2 mols hydrogen peroxide without the use of organic solvents which comprises adding the cyclohexanone to an aqueous solution of hydrogen peroxide containing about 2 to 20% of nitric acid based on the water content of such aqueous solution, the rate of such addition being such that only $\frac{1}{20}$ to $\frac{1}{5}$ of the total quantity of cyclohexanone is added to such solution before crystals begin to form in the reaction solution, the remainder of the cyclohexanone being added only after the formation of such crystals is initiated, and after completion of the reaction separating the resulting crystalline reaction product from the aqueous reaction solution.

References Cited in the file of this patent

UNITED STATES PATENTS

| 2,270,175 | Tadema | Jan. 13, 1942 |
| 2,298,405 | Milas | Oct. 13, 1942 |

OTHER REFERENCES

Stoll et al.: Chem. Abstracts, vol. 24 (1930), pp. 2732–3.

Bjorklund et al.: Chem. Abstracts, vol. 45 (1951), col. 7951–2 (1 page).